Figure 1:
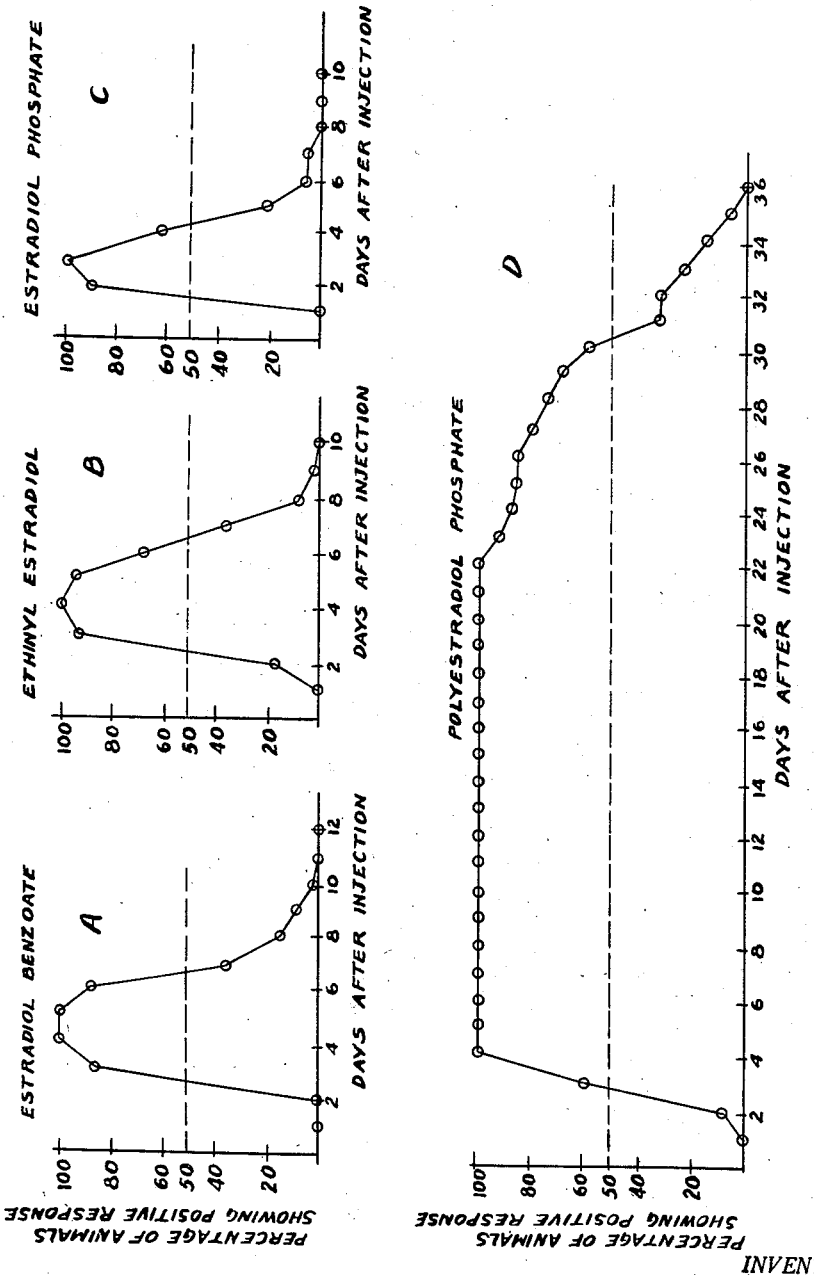

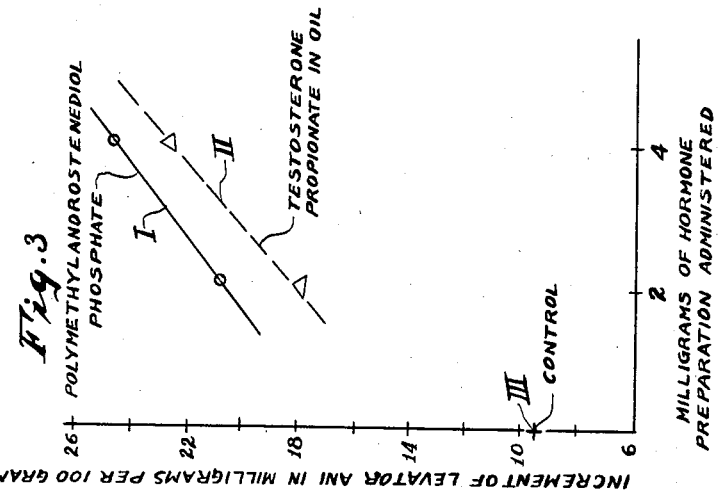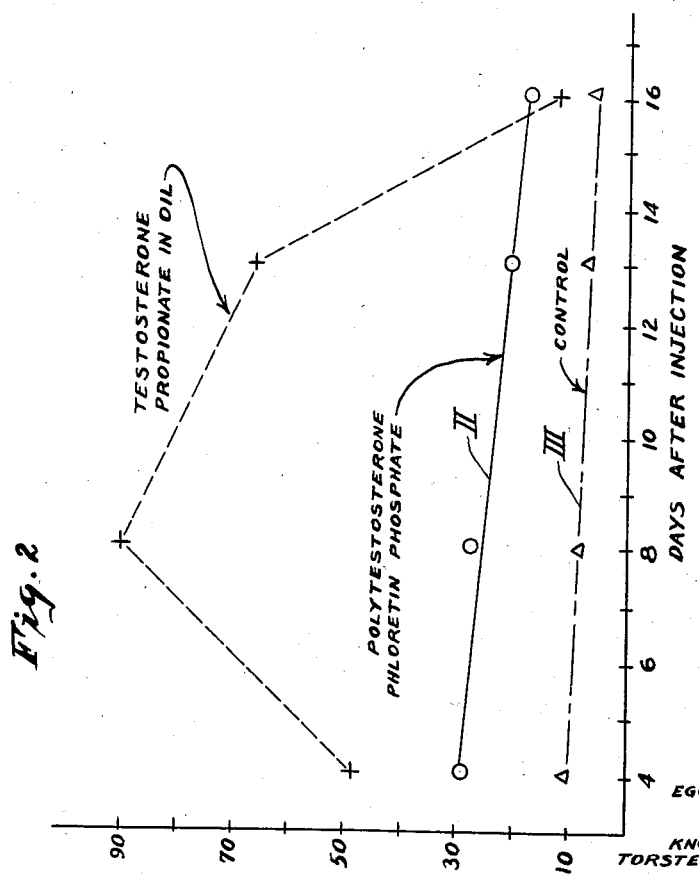

United States Patent Office 2,928,849
Patented Mar. 15, 1960

2,928,849

HIGH-MOLECULAR WEIGHT DERIVATIVES OF STEROIDS CONTAINING HYDROXYL GROUPS AND METHOD OF PRODUCING THE SAME

Egon Rihardt Diczfalusy, Sollentuna, and Ove Birger Fernö, Hans Jakob Fex, Knut Bertil Högberg, and Torsten Ove Enok Linderot, Halsingborg, Sweden, assignors to Aktiebolaget Leo, Halsingborg, Sweden, a firm Application November 8, 1954, Serial No. 467,482

Claims priority, application Denmark November 20, 1953

2 Claims. (Cl. 260—397.5)

This invention relates to high-molecular derivatives of hydroxyl group-containing steroids, i.e., steroids with hydroxyl groups in the molecules as well as steroids in which the hydroxyl groups result from the enolization of keto groups. Compounds of both types are intended to be included within the scope of the term "steroids containing free hydroxyl groups," or "hydroxyl group-containing steroids," as used herein.

This invention has for its especial object the production of certain derivatives which are capable of producing and maintaining, in an organism, the biological effects of the steroid contained in that derivative for a longer period of time than has hitherto been possible. The invention is of particular interest in connection with those steroids having hormonal effects.

It is known that, at any particular moment of time, the hormone content in a hormone-producing organ is low in comparison with the amount of hormone which must be supplied to that organism in order to obtain a distinct hormonal effect. This has been clearly established by animal tests, as well as by the clinical use of the hormones in question. The conclusion can be drawn from this that the hormones are continuously excreted from the seat at which they are produced, and that they do not accumulate therein. Accordingly, the best way of administering hormones should be to imitate this natural biologic state of affairs insofar as possible, and to this end it is a primary purpose of this invention to produce hormone preparations having continuous and protracted effect.

The previous attempts to prepare steroid hormone preparations having protracted effects may be summed up as follows:

(a) Administration of derivatives, mainly esters, as for instance testosterone propionate and estradiol benzoate, where the prolonged effect is produced thereby that the substance has to be hydrolyzed in the organism before a biological effect can set in.

(b) Administration of the hormone in oil depots wherefrom it is only slowly resorbed.

By combining (a) and (b), preparations can be produced which combine both principles.

(c) Administration of the hormone in solid amorphous form as a suspension or an adsorbate on, for example, carbon or aluminum phosphate, by injecting a suspension of micro-crystals or by implanting tablets of micro-crystals, the so-called pellets.

None of the said methods are particularly satisfying. Thus injection of the hormone in oil must be repeated fairly often, which means that unpleasant oil depots are left which the organism cannot dispose of at all, or can only dispose of with difficulty. Preparations containing steroid hormones adsorbed on, for example, aluminum phosphate produce inflamatory reactions and other secondary effects. By implantation of the so-called pellets, an uneven and discontinuous progress of the resorption process is often noticed, and all in all it is questionable whether a sufficiently even and continuous resorption can be obtained in this manner. Moreover, the implanted object is often embarrassing, and in some cases it will be expelled from the place of implantation. In respect of the preparations mentioned under (b) and (c) it will further be difficult to insure perfect sterility.

It is an object of the present invention to prepare high-molecular weight compounds of hydroxyl group-containing steroids, from which compounds it is possible to make preparations for therapeutic purpose which do not have the disadvantages of previous preparations, and in which the effect of the hormone, when the preparation is administered, is prolonged. In many cases, greatly prolonged effectiveness of hormonal action is secured.

The high-molecular compounds, according to the present invention, are esters of the acids of phosphorus (including phosphorus and thiophosphoric acid) with hydroxyl group-containing steroids (including steroids in which the hydroxyl groups result from the enolization of keto groups). They consist of chain-shaped molecules, the single links of which are coupled together by the phosphorus acid groups, and in which the steroid is present in the form of steroid-phosphorus acid groups.

Here and later on in the specification and in the appended claims the term "phosphorus acid groups" should be understood as including phosphate as well as phosphite and thiophosphate groups, and the term "chain-shaped molecules" should be understood as comprising both straight chain and branched chain molecules.

In the disclosure which follows a detailed explanation will be given as to the nature of the novel high-molecular weight compounds and the kind of groups contained therein, as well as details regarding a preferred method for producing them. The novel method by which the compounds can be prepared is also a specific object of this invention. Further, the effects which can be obtained by means of the novel compounds upon their administration will be illustrated by means of typical examples.

The high-molecular compounds of the invention can be produced by reacting the steroid with a phosphorylating agent, this term being herein used to include thiophosphorylating agents, under such conditions in respect of the amount and concentration of the phosphorylating agent, the reaction temperature and the time elapsing before the reaction is stopped, that the steroid molecules alone or together with a coupling substance form high-molecular products in which the steroid is contained in the shape of steroid-phosphorus acid groups.

By varying the conditions under which the phosphorylation takes place, products may be obtained, having different molecular sizes, whereby it is possible to get a more or less protracted effect of the compounds. Generally, the reaction is expediently carried through at temperatures below 0° C., but for tardy reactions it may be expedient to increase the reaction temperature up to the neighborhood of 100° C., if desired.

According to the invention it is expedient to continue the treatment with the phosphorylating agent until the molecular weight of the products is more than 2000, since this will result in products that exhibit a completely satisfying protracted effect.

When the reaction has reached a suitable stage which, for instance, may be controlled by testing the dialyzability of the product, the reaction is stopped. According to the invention this may expediently be accomplished by hydrolysis of the reaction mixture. Thus, for instance, the reaction may be stopped by adding crushed ice to the reaction mixture, or by pouring the latter into ice water.

According to a particularly satisfactory method of carrying out the invention, the steroid is treated with an amount of phosphorylating agent not substantially exceeding the equimolar amount, and in case a coupling substance is further used it is preferable that the phosphorylating agent is used in an amount not substantially exceeding the equimolar amount as compared with the total amount of steroid and coupling substance.

By limiting the amount of phosphorylating agent in this manner, the formation of chain-shaped molecules is promoted, since the single molecules of the phosphorylating agent thereby have greater possibilities of simultaneously reacting with different molecules of the steroid, the coupling substance, or with both.

As it appears from this description of the method, it is a condition for its accomplishment that the steroid contains one or more hydroxyl groups including hydroxyl groups resulting from keto groups being enolized, since steroids not containing such groups cannot be phosphorylated.

A diester of estradiol with phosphoric acid is known, but retains its hormone effect only a relatively short time after injection into the organism, just as the esters mentioned above under group (a).

A monoester of estradiol with phosphoric acid is also known, but it has a lower estrogenic effect. In view of these facts it could not be foreseen that high-molecular compounds of steroids, in which the steroid hormone groups are condensed by esterification with phosphorus acid groups, would show a high hormonal effect. On the contrary, it might be expected that they would only have a low hormone effect, just as the monophosphate of estradiol. Accordingly, the possibility of attaining a considerable—possibly even a very high—protracted effect could still less be foreseen from these known facts.

Preferably, phosphorus oxyhalide, phosphorus trihalide or thiophosphoryl halide, especially the chlorides, are used as phosphorylation agents, but other such agents may also be used, if desired, in combination with the above as, for example, phenylphosphoryl dichloride.

It is assumed that the protracted effect of the novel compounds results from the compounds being decomposed piecemeal in the organism, presumably by the action of enzymes. In some cases, it may be expedient to be able to regulate this decomposition, and it is an object of the invention to provide the possibility for such a variation of the speed, with which the steroid is placed at the disposal of the organism. In order to attain this object, the steroid may be phosphorylated or thiophosphorylated and coupled with a special coupling substance through the phosphorus acid group or groups. This makes it possible to build up high-molecular compounds in which only some of the groups, which are linked together by phosphorus acid groups, are of steroid character, for instance every second group, so that the liberation of the hormone is correspondingly delayed. Substances built up in this manner, therefore, are also comprised within the scope of the invention.

According to the invention, the coupling substance may be an aromatic di- or polyamine, a di- or polyphenol, or an aminophenol, wherein the amino and hydroxyl groups, if there are only two, are not adjacent. Examples of such substances are phloroglucinol, phloretin, phloridzin and phloramine. Moreover, many other natural or synthetically-produced substances of similar character exist which are suitable as coupling substances in the present compounds. Some of these are mentioned in United States patent application of Ove Birger Fernö et al., No. 362,312, filed June 17, 1953, and high-molecular compounds, in which these coupling substances form part together with steroids, are also among the objects of the present invention.

It is also possible to use coupling substances of non-aromatic character, if they fulfill the condition of being able to exist, as or to be built up to, high-molecular compounds with free hydroxyl or amino groups, to which the steroid groups can be linked by phosphorylation or thiophosphorylation. Examples of such substances are polyvinyl alcohol, dextran, gelatin and other similar high-molecular weight products which are compatible with the organism.

The use of a coupling substance makes it further possible to build up high-molecular compounds from steroids having in the molecule only one hydroxyl group including such hydroxyl group which results from a keto group being enolized, whereas, if no coupling substance is used, the steroid in question should have at least two such groups in the molecule in order that the chain formation necessary for producing high-molecular weight compounds may be attained.

According to a preferred embodiment of the invention a steroid having in the molecule only one hydroxyl group including such hydroxyl group which results from a keto group being enolized is coupled by phosphorylation or thiophosphorylation to a substance with at least three amino- or hydroxyl groups or both kinds of groups, whereby molecules of the said substance are coupled together by means of phosphorylation or thiophosphorylation before, during or after coupling with the steroid-containing group. Thus, two of the amino- or hydroxyl groups of the coupling substance serve for the building-up of a chain in which the links are connected by means of phosphorus acid groups and a third amino or hydroxyl group serves to bind the steroid through the phosphorus acid group, whereby the steroid is coupled to the chain. High-molecular compounds built up in this manner are within the scope of the invention.

Practically, this embodiment of the invention may be carried out by first phosphorylating the steroid with the equimolar amount or, preferably, with a slight surplus of the phosphorylating agent. If phosphorus oxychloride is the phosphorylating agent utilized, compounds are formed of the type $ROP(O)Cl_2$, wherein R represents the steroid group. Then the coupling substance is added, whereby either diesters are formed of the type $ROP(O)(Cl)OR_1$, wherein $R_1$ is a group derived from the coupling substance, or the corresponding ester amides. Then a further amount of phosphorylating agent is added, and, since $R_1$ contains at least two hydroxyl or amino groups which are not involved in the diester or esteramide formation, a coupling with phosphorus acid groups may take place at suitable conditions of reaction, resulting in high-molecular compounds. It is also possible to proceed in such a manner that the steroid and the coupling substance are directly mixed, after which the mixture is phosphorylated, or the coupling substance may first be phosphorylated, and then the phosphorylated steroid or non-phosphorylated steroid, together with phosphorylating agent, is added.

According to the invention, an agent promoting condensation may be used, such as tertiary amine, in order to promote the building-up of high-molecular compounds. Examples are pyridine and quinoline. Sometimes the condensation agent may also serve as a reaction medium, but it will often be expedient to use an inert solvent, such as ether, dioxane or acetone.

Examples of steroids, which may be phosphorylated directly to high-molecular compounds and which, accordingly, contain at least two hydroxyl groups including hydroxyl groups which result from keto groups being enolized, are estradiol methylandrostenediol, estriol, testosterone, pregnanediol and digitoxigenin. Examples of steroids containing only one hydroxyl group, and which may accordingly be built up to high-molecular compounds by means of a coupling substance, are estrone, testosterone and 19-nor-testosterone. High-molecular compounds of these steroids with phosphorus acids and, if desired, coupling substances, are within the scope of the invention, as well as the corresponding compounds of other similar steroids.

As mentioned above it is characteristic of the compounds according to the invention that they consist principally of chain-formed molecules, in which the single groups are linked together by phosphorus acid groups, and wherein the steroid is contained as steroid-phosphorus acid groups.

The compounds prepared in accordance with the invention are soluble in water at neutral or alkaline reaction and are fairly stable against hydrolysis.

In the simplest case, that in which the steroid used has at least two hydroxyl groups in the molecule, the compounds of the invention consist of steroid groups linked together by phosphorus acid groups.

As mentioned above, it may be desirable to produce compounds which, for a given molecular weight, contain less steroid than do the simplest compounds. As mentioned, this can be brought about by using a coupling substance, and according to the invention compounds of this kind consist of chain-shaped molecules, wherein steroid groups and groups derived from aromatic di- or polyamines, di- or polyphenols or aminophenols with at least two non-adjacent hydroxyl or amino groups, are linked together with phosphorus acid groups. The amount of steroid in these compounds is dependent on the molar proportion between steroid and coupling substance, and may be varied by modifying this proportion.

In the case of steroids with only one hydroxyl group in the molecule, a coupling substance is used to build up the high-molecular weight compounds, and according to the invention such compounds consist of chain-shaped molecules, wherein the phosphorus acid groups link together groups which are derived from aromatic polyamines, polyphenols or aminophenols with at least three hydroxyl or amino groups or both kinds of groups in the molecule, to which latter groups the steroid is linked through phosphorus acid groups. The latter groups may hereby be linked to a single, to several, or to all of the links bound together by phosphorus acid groups in the chain-shaped molecule, all in accordance with the proportions in which steroid and coupling substance are used.

While compounds of lower molecular weight are also within the scope of the invention, the above specified conditions for their building-up being observed, the preferred compounds of the invention will preferably have, however, a molecular weight of at least 2000, as this is a condition for their having a greatly prolonged effect when used therapeutically. When the molecular weight is above 2000, the compounds are non-dialyzable if suitable dialysis membranes are used. During the preparation, this gives the possibility of eliminating compounds with lower molecular weight not having the desired prolonged effect.

The prolongation of the period of effectiveness of steroid hormones is most easily substantiated by means of animal tests. When testing the strength of estrogens, the so-called vaginal smear technique is used, i.e., the duration of vaginal oestrus in the test animals (castrated mice) is determined.

For investigating the strength of androgens, the increase in weight of the prostata may be used, and for testing the anabolic effect, the weight increase of the levator ani may be used as a measure.

The result of such tests is illustrated in the drawings, wherein:

Figure 1 includes the Graphs A, B, C and D, showing the effect of injections of estradiol benzoate, ethinyl estradiol, estradiol phosphate and a polyestradiol phosphate in accordance with the invention, respectively;

Figure 2 contains the curves I, II and III, illustrating the effect of injections of testosterone propionate in oil, and of a polytestosteronephloretin phosphate in accordance with the invention, in comparison with control tests; and Figure 3 contains the curves I and II showing the effect of a polymethylandrostenediol phosphate according to the invention, and of testosterone propionate in oil, respectively, as well as a control test represented by the point III.

In Figure 1 the ordinate of the curves represents the percentage of test animals which showed responses to the hormone injection, and the abscissa gives the time in days after the injection. As a measure of the hormonal effect, there is used the number of days in which at least 50 percent of the test animals display vaginal oestrus. The 50 percent border is shown in dotted lines on the graphs of Fig. 1.

In the case of estradiol diphosphate, 200 micrograms were used for the injection, and in the case of the other products 20 micrograms were used, dissolved in equal amounts of propylene glycol. It appears from the curves that the effect of the estradiol benzoate, the ethinylestradiol and the estradiol diphosphate injections has a duration of about 4, 4 and 3 days, whereas the effect of the polyestradiol phosphate is of about 26 days' duration. This shows without question that the estradiol is liberated continuously and very slowly from the polyestradiol phosphate, which is exactly the effect which should be aimed at in order to approach natural hormone production as closely as possible.

Corresponding tests have been made with polyestronephloretin phosphate with quite similar results, and clinical tests have further confirmed the results obtained in the animal tests.

In Figure 2, curve I shows the weight of the ventral prostata at different times after administration to castrated rats of 3.75 mg. of testosterone propionate in oil; curve II illustrates corresponding tests with 3.75 mg. of polytestosteronephloretin phosphate; and curve III represents the results obtained with untreated control animals, the ordinate giving the weight in milligrams of the ventral prostata, and the abscissa giving the number of days after the injection. Each point on the curves represents five animals.

The curves show that with polytestosteronephloretin phosphate a very uniform and strongly prolonged effect is obtained. Even if the supplied amount of testosterone in the shape of polytestosteronephloretin phosphate is only half of that supplied as testosterone propionate, and even if the preparation in accordance with the invention is supplied as an aqueous solution, whereas the propionate is supplied as a depot preparation in oil, the hormonal effect of the preparation according to the invention exceeds that of the testosterone propionate after 16 days.

In Figure 3, curve I shows the effect on the increment of levator ani in castrated rats of polymethylandrostenediol phosphate administered in aqueous solution; curve II shows the effect of the same dose of testosterone propionate in oil; and the point III represents a control test. The ordinate gives the increment of levator ani in milligrams per 100 grams of test animals, and the abscissa the amount of administered hormone preparation in milligrams, each point on the curves representing five animals, and the determinations having been made on the 13th day after the injections. It appears from the experiment that polymethylandrostenediol phosphate has a strong and very prolonged anabolic effect.

That there is no question of a depot effect at the place of injection, as in the known preparations with prolonged effect, is shown by an experiment, where a phosphorylating agent containing radioactive phosphorus ($P^{32}$) was used for the production of the products in accordance with the invention. These tests have shown that the high-molecular compounds of the invention are retained in the organism, as, for example, in the blood and the liver. Because of their high molecular weight and their polyanionic character, it is likely that the compounds are coupled to proteins in the organism.

The invention can be illustrated by the following examples:

Example 1

Three grams of estradiol was dissolved in 75 ml. of anhydrous pyridine. The solution was cooled to −10° C., whereupon a solution of 1.1 ml. of phosphorus oxychloride in 10 ml. of anhydrous pyridine was added, with agitation. After the addition, which required seven minutes, the reaction mixture was kept at −10° C. for a further period of 3 hours, and then it was left standing at room temperature for 15 hours. A clear solution thus resulted, to which finely crushed ice was then added. The resulting solution was evaporated in vacuum to dryness. After drying in a vacuum desiccator, 3.8 g. of a white powder was obtained. This powder was suspended in 2 ml. of pyridine, and 25 ml. of 0.5-normal sodium hydroxide was added, whereupon a solution was obtained which was then diluted with water to 100 ml. The solution was then dialysed through a cellophane membrane against 4 liters of water for 10 hours, with stirring. The dialysis was repeated two additional times, with fresh amounts of water. To the dialysed solution there was added 2 ml. of 1-normal hydrochloric acid, whereupon polyestradiol phosphate was precipitated as a white bulky precipitate. This was centrifuged off and washed repeatedly with 0.1-normal hydrochloric acid. Thereafter it was dryed in a vacuum desiccator. The yield was 3 g. of polyestradiol phosphate. The analysis shows 0.65 percent of water, 1.35 percent of pyridine and 9.3 percent of phosphorus (calculated on a dry sample).

Example 2

0.55 gram of methylandrostenediol were dissolved in 15 ml. of anhydrous pyridine. The solution was cooled to −10° C., whereupon a solution of 0.18 ml. of phosphorus oxychloride in 5 ml. of anhydrous pyridine was added, with agitation. The addition required 3 minutes. The reaction mixture was left standing and hydrolyzed as in Example 1. The recovered solution was evaporated and, after drying in a vacuum desiccator, there was obtained 0.65 g. of a yellow powder. This contained 60 percent of non-dialyzable polymethylandrostenediol phosphate.

Example 3

0.016 gram of estriol was dissolved in 0.8 ml. of anhydrous pyridine. The solution was cooled to −15° C., whereupon 0.55 ml. of a solution of 0.5 ml. of phosphorus oxychloride in 50 ml. of anhydrous pyridine was added. The reaction mixture was allowed to stand for 5 hours at −5° C., and then worked up as in Example 2. The yield was 0.0125 g. of polyestriol phosphate.

Example 4

0.5 g. of testosterone was dissolved in 10 ml. of anhydrous pyridine. At −10° C. the solution was added dropwise, with agitation, to a solution of 0.19 ml. of phosphorus oxychloride in 6 ml. of anhydrous pyridine. The addition required 4 minutes. The mixture was allowed to stand at −10° C. for one-half hour, whereupon it was added dropwise, with agitation and cooling to a solution of 0.47 g. of phloretin in 5 ml. of anhydrous pyridine. The addition required 2 minutes. The mixture was left standing at −10° C. for ½ hour, whereupon a solution of 0.15 ml. of phosphorus oxychloride in 5 ml. of anhydrous pyridine was added dropwise, with agitation. The addition required 3 minutes. The mixture was left standing at −10° C. for 3 hours, and then at room temperature for a further period of 15 hours. Finely crushed ice was then added to the mixture and, after filtration of a minor amount of undissolved substance, the solution was evaporated in vacuum to dryness. The residue was dissolved in 10 ml. of 2-normal sodium hydroxide solution, and precipitated with 15 ml. of 2-normal hydrochloric acid saturated with sodium chloride. The product was filtered and washed with saturated sodium chloride solution, and then dried in a vacuum desiccator. The yield was 1.8 g., and the product contained 75 percent of non-dialyzable polytestosteronephloretin phosphate.

Example 5

0.251 g. of testosterone was dissolved in 5 ml. of anhydrous pyridine. At −10° C., the solution was added with agitation to a solution of 0.095 ml. of phosphorus oxychloride in 3 ml. of anhydrous pyridine. The addition required 2 minutes. The mixture was left standing at −10° C. for one-half hour, whereupon it was added dropwise, with agitation, and cooling, to a solution of 0.11 g. of phloroglucinol in 2.5 ml. of anhydrous pyridine. The addition required 2 minutes. The mixture was left standing at −10° C. for 1 hour, whereupon a solution of 0.075 ml. of phosphorus oxychloride in 2.5 ml. of pyridine was added with shaking. The mixture was then left standing at −10° C. for 3 hours, and at room temperature for a further period of 15 hours. Finely crushed ice was then added, and the resulting solution was evaporated to dryness in vacuo, whereupon it was worked up as in Example 4. The yield was 0.33 g. and the product contained 93 percent of non-dialyzable polytestosteronephloroglucinol phosphate.

Example 6

0.235 g. of estrone was dissolved in 5 ml. of anhydrous pyridine. The solution was added with shaking to a solution of 0.095 ml. of phosphorus oxychloride in 3 ml. of anhydrous pyridine. The addition required 3 minutes, and the mixture was left standing at −10° C. for one-half hour, whereupon it was added dropwise with shaking and cooling to a solution of 0.11 g. of phloroglucinol in 2.5 ml. of anhydrous pyridine. The addition required 2 minutes. The treatment was continued in the same manner as in Example 4. The yield was 0.33 g. and the product contained 91 percent of non-dialyzable polyestronephloroglucinol phosphate.

Example 7

0.47 g. of estrone are dissolved in 10 ml. of anhydrous pyridine. The solution was added with agitation to a solution of 0.18 ml. of phosphorus oxychloride in 6 ml. of anhydrous pyridine which was cooled to −10° C. The addition required 4 minutes. The mixture was left standing at −10° C. for one-half hour, whereupon it was added dropwise, with shaking, to a solution of 0.47 g. of phloretin in 5 ml. of anhydrous pyridine which was cooled to −10° C. The addition required 3 minutes. The mixture was left standing at −10° C. for one-half hour, whereupon a solution of 0.15 ml. of phosphorus oxychloride in 5 ml. of anhydrous pyridine was added with cooling and agitation. The mixture was left standing at −10° C. for one and one-half hours and finely crushed ice was then added. A small amount of precipitate, which remained undissolved, was filtered off, and the filtrate was evaporated in vacuum to dryness, whereupon it was worked up in the manner described in Example 4. The yield was 1.05 g., and the product contained 95 percent of non-dialyzable polyestronephloretin phosphate.

Example 8

0.235 g. of estrone was dissolved, with shaking, to a pyridine. The solution was added, with shaking, to a solution of 0.095 ml. of phorphorus oxychloride in 3 ml. of anhydrous pyridine which was cooled to −10° C. The addition required 2 minutes. The mixture was left standing at −10° C. for one-half hour, whereupon it was added dropwise, with agitation, to a solution of 0.264 g. of quercetin in 2.5 ml. of anhydrous pyridine which was cooled to −10° C. The addition again required 2 minutes. The mixture was left standing at −10° C. for 1 hour, whereupon a solution of 0.075 ml. of phosphorus oxychloride in 2.5 ml. of anhydrous pyridine was added with continued cooling and shaking. The addition required 2 minutes. The mixture was left standing at —10° C. for 3 hours, whereupon finely crushed ice was added. The resulting solution was evaporated, in vacuum, to dryness, and then worked up as described in Example 4. The yield was 0.65 g. and the product contained 95 percent of non-dialyzable polyestronequercetin phosphate.

*Example 9*

0.235 g. of estrone was dissolved in 5 ml. of anhydrous pyridine. The solution was added, with agitation, to a solution of 0.095 ml. of phosphorus oxychloride in 3 ml. of anhydrous pyridine which was cooled to —10° C. The addition required 2 minutes. The mixture was left standing at —10° C. for one-half hour, whereupon it was added dropwise, with shaking, to a solution of 0.37 g. of phloridzin (anhydrous) in 5 ml. of anhydrous pyridine which was cooled to —10° C. The addition required 2 minutes. The mixture was left standing at —10° C. for one and one-half hours, whereupon a solution of 0.12 ml. of phosphorus oxychloride in 4 ml. of anhydrous pyridine was added with continued cooling and shaking. The addition required 2 minutes. The mixture was left standing at —10° C. for 2 hours, whereupon finely crushed ice was added. The working up was then carried out as described in Example 4. The yield was 1.1 g., and the product contained 94 percent of non-dialyzable polyestronephloridzin phosphate.

*Example 10*

0.235 g. of estrone was dissolved in 5 ml. of anhydrous pyridine. The solution was added, with agitation, to a solution of 0.095 ml. of phosphorus oxychloride in 3 ml. of anhydrous pyridine which was cooled to —10° C. The addition required 2 minutes. The mixture was left standing at —10° C. for one-half hour, whereupon it was added dropwise with shaking to a solution of 0.53 g. of rutin (anhydrous) in 5 ml. of anhydrous pyridine which was cooled to —10° C. The addition required 2 minutes. The mixture was left standing at —10° C. for one and one-half hours, whereupon a solution of 0.19 ml. of phosphorus oxychloride in 6 ml. of anhydrous pyridine was added with continued cooling and shaking. The addition required 3 minutes. The mixture was left standing at —10° C. for 15 minutes, and finely crushed ice was then added. The working up was carried out as in Example 4. The yield was 0.6 g., and the product contained 90 percent of non-dialyzable polyestronerutin phosphate.

*Example 11*

0.25 g. of estradiol was dissolved in 10 ml. of anhydrous pyridine. At —10° C. a solution of 0.13 ml. of thiophosphoryl chloride in 5 ml. of anhydrous pyridine was added with cooling and agitation. The addition required 5 minutes. The mixture was left standing at —10° C. for 3 hours, and then at room temperature for a further period of 15 hours. Finely crushed ice was then added, and the resulting solution was then evaporated to dryness in vacuo. The residue was ground with 2-normal hydrochloric acid, and then filtered and washed with water. It was then dried in a vacuum desiccator. The yield was 0.3 g., and the product contained 95 percent of non-dialyzable polyestradiol thiophosphate.

*Example 12*

0.272 g. of estradiol and 0.11 g. of resorcinol were dissolved in 5 ml. of anhydrous pyridine. A solution of 0.19 ml. of phosphorus oxychloride in 5 ml. of anhydrous pyridine was then added at —10° C., with shaking. The addition required 3 minutes. The mixture was left standing at —10° C. for 3 hours, and then at room temperature for a further period of 15 hours. Finely crushed ice was then added, and after standing for 24 hours a clear solution was formed. This solution was then evaporated to dryness in vacuo. The solid product was dissolved in 10 ml. of 1-normal sodium hydroxide solution, and precipitated therefrom with 5 ml. of 5-normal hydrochloric acid. The precipitate was filtered off and washed with a few milliliters of water, and then it was dried in a vacuum desiccator. The yield was 0.5 g. and the product contained 96 percent of non-dialyzable polyestradiolresorcinol phosphate.

*Example 13*

0.55 g. of estradiol was dissolved, with heating, in 5 ml. of anhydrous dioxan. Then 0.19 ml. of phosphorus oxychloride was added, and the solution was heated on a steam bath with reflux. After 17 hours, an amorphous mass was formed. The mixture was then cooled, and 50 ml. of water was added. A precipitate was formed and it was then filtered off, washed with water and dried in a vacuum desiccator. The yield was 0.71 g., and the product contained 75 percent of non-dialyzable polyestradiol phosphate. The analysis of a dry sample showed 3.1% of water, and 8.2% of phosphorus.

*Example 14*

0.3 g. of testosterone was dissolved in 10 ml. of anhydrous pyridine. 0.11 ml. of phosphorus oxychloride was then added in one portion at 20° C. The mixture was left standing for 48 hours at room temperature, and then heated on a steam bath for 1 hour. Afterwards it was cooled, and finely crushed ice was added to it. The resulting solution was evaporated under vacuum to dryness, and the residue was ground with dilute hydrochloric acid. The reddish powder was obtained, and, upon dialysis, it was shown to contain 90 percent of non-dialyzable polytestosterone phosphate.

*Example 15*

0.55 g. of estradiol was dissolved in 5 ml. of dioxan. After the addition of 0.18 ml. of phosphorus trichloride, the mixture was heated for 25 hours on a steam bath, with reflux. After cooling, finely crushed ice was then added. There was thus obtained a white precipitate. This precipitate was filtered off, and washed with water. After drying in a vacuum desiccator, 0.66 g. of a white powder was obtained. The product contained about 50 percent of non-dialyzable polyestradiol phosphite. The phosphorus content of the dry product was 9.3%.

Throughout the descriptive portion of this specification and in the appended claims wherever the terms "hydroxyl containing steroids," or "steroids containing one or more hydroxyl groups" are used, it is intended to include within the scope of each said term or terms those steroids which contain hydroxyl groups resulting from an enolization of keto groups. Also, wherever the terms "phosphorylation" or "a phosphorylating agent" are employed herein, it is intended that thiophosphorylation, as well as the use of thiophosphorylating agents, shall be included within the scope thereof.

Since various changes and modifications may be made in the invention, certain preferred embodiments of which have been herein described, it is the intention that such changes and modifications as are within the scope of the appended claims shall be considered as part of the invention.

We claim:

1. The process of preparing a compound selected from the group consisting of polyestradiol phosphate and polyestriol phosphate which comprises: adding phosphorus oxychloride in a slight excess over the equimolar amount to a cooled solution of a substance selected from the group consisting of estradiol and estriol, said substance being in anhydrous pyridine; allowing the resulting reaction mixture to stand at a temperature below room temperature until the reaction is substantially complete; permitting said reaction mixture to warm up to room temperature and hydrolyzing the same by adding crushed ice thereto; evaporating the resulting solution to dryness at a reduced pressure less than atmospheric, thereby securing a powdery product; suspending said powdery product in pyridine and adding thereto a solution of sodium hydroxide, thereby obtaining a clear solution; diluting said solution by the addition of water thereto and dialyzing said diluted solution through a cellophane membrane against water; adding hydrochloric acid to said dialyzed solution, whereupon a solid product precipitates therein; and removing said precipitated product.

2. A compound selected from the group consisting of polyestriadiol phosphate and polyestriol phosphate prepared in accordance with the process of claim 1.

References Cited in the file of this patent

UNITED STATES PATENTS

| 2,183,589 | Reichstein | Dec. 19, 1939 |
| 2,381,073 | Miescher | Aug. 7, 1945 |

FOREIGN PATENTS

| 201,536 | Switzerland | Feb. 16, 1939 |
| 201,537 | Switzerland | Feb. 16, 1939 |

OTHER REFERENCES

Fieser et al.: Natural Products Related to Phenanthrene, 3rd ed., pages 407, 424–426 (1949).